Oct. 20, 1959     B. I. ULINSKI     2,909,377

STABILIZER FOR INDUSTRIAL TRUCKS

Filed Oct. 12, 1956     2 Sheets-Sheet 1

INVENTOR.
B. I. Ulinski
BY
A. H. Golden
ATTORNEY

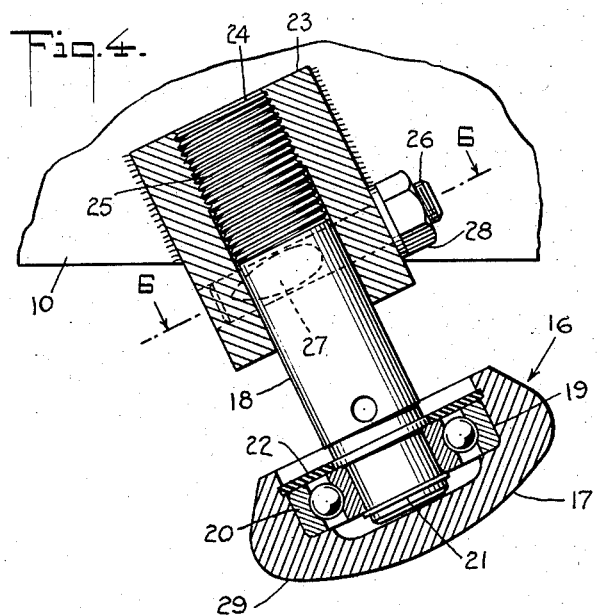
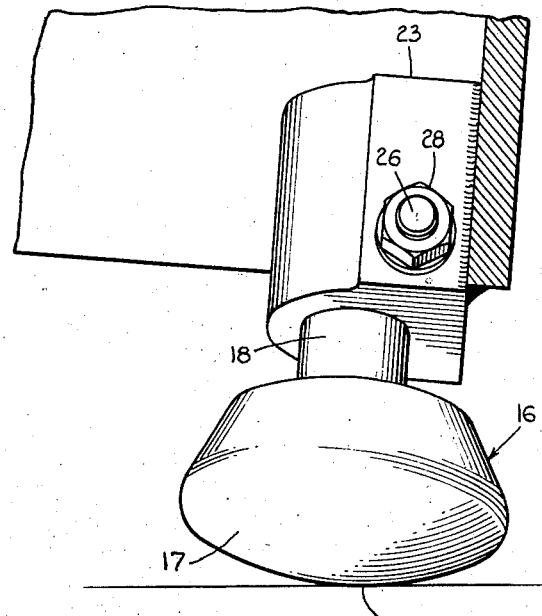
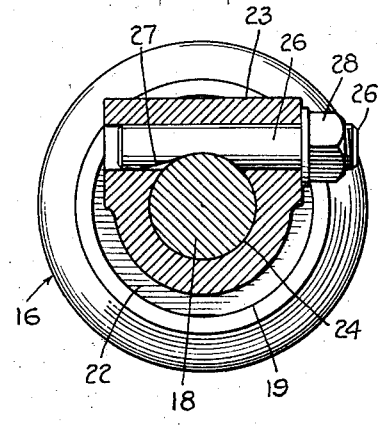

United States Patent Office 2,909,377
Patented Oct. 20, 1959

2,909,377

STABILIZER FOR INDUSTRIAL TRUCKS

Bronislaus I. Ulinski, Flossmoor, Ill., assignor to The Yale & Towne Manufacturing Company, Stamford, Conn., a corporation of Connecticut Application October 12, 1956, Serial No. 615,667

3 Claims. (Cl. 280—62)

This invention relates to industrial trucks, and particularly to means for stabilizing an industrial truck to prevent tipping or jogging of the truck from side to side under particular conditions. My invention relates more particularly to the three-wheel powered type of truck set forth in the Quayle Patent No. 2,614,643 granted October 21, 1952.

As is well set forth in the Quayle patent, the trucks of the particular class often have a tendency to tip, especially when the truck is steered at a sharp angle. In order to stabilize the truck, Quayle proposed that the truck be equipped with a small wheel at each side thereof, and that this wheel have a rounded ground engaging surface so that the wheel will roll bodily with the truck against the ground. As Quayle indicated, his invention was a substantial contribution to the art because wheels having flat surfaces, and used in the prior art on the main frames on trucks of the particular class, permit substantial jogging of the truck between opposed tilted positions. In other words, those prior trucks when tipping will bring one wheel at one side of the truck into contact with the ground, but since that contact is a line contact at the edge of the wheel, the reaction is hard and the truck immediately jogs to the opposed side. There again the reaction is hard and the truck jogs back again. This jogging, in many cases, is extremely severe. With the Quayle construction, the jogging was substantially decreased and almost entirely eliminated.

A further arrangement of the prior art involves the use of a pair of caster wheels positioned one at each edge of the truck frame. When the truck starts to tip, one of those caster wheels contacts the ground and acts as a stop to prevent further tipping. Since the caster wheel usually will not be in a proper tracking position when the truck tips, that wheel will skid before moving into properly aligned position. In most instances, the caster wheel will contact the ground only momentarily, with the result that the caster does not have sufficient opportunity to move into aligned position. Under those conditions the caster wheel skids and scrubs the floor, so that the wheel wears rapidly and also damages the floor by its skidding action. The Quayle construction also is subject somewhat to this defect, since in Quayle the stabilizing wheels may be at an angle to the actual movement of the truck when tipping occurs through steering of the truck at a sharp angle.

I believe that I have made a very considerable contribution to the prior art through the concept of a button or dome shaped member applied to each side of the truck in such relation thereto that the dome shaped member will present a rounded surface for contact with the ground as in Quayle, thereby acting effectively to prevent jogging. In addition, the rounded surface of my member will rotate, and because of the manner in which the member is mounted the rotation will be in the direction of side pivoting of the truck. Thereby, while Quayle presents through his stabilizing wheels a narrow round contacting surface, I am able to present a continuous rounded surface that will not require movement to an aligned position as in the case of the caster wheel, and that will effectively snub and stabilize the truck relatively to the ground so that the truck will not jog from side to side.

Thus, as a feature of my invention, I utilize a button or dome shaped stabilizing member mounted for rotation on the truck and adapted to present a relatively large surface to the ground as the truck is tilted. As a further feature of the invention, my stabilizing member is adapted to be mounted at an angle so that it will rotate in the axis of its mounting as it contacts the ground or floor incidental to the tilting of the truck. Thereby, I am able to present a continuous surface that will always oppose the tilting of the truck, as those skilled in the art will appreciate after a review of the description of my invention that follows.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 4 is a longitudinal section on the line 4—4 in Fig. 2.

Fig. 5 is a rear view of the stabilizer shown in Fig. 4.

Fig. 6 is a section on the line 6—6 in Fig. 4.

Figure 1:
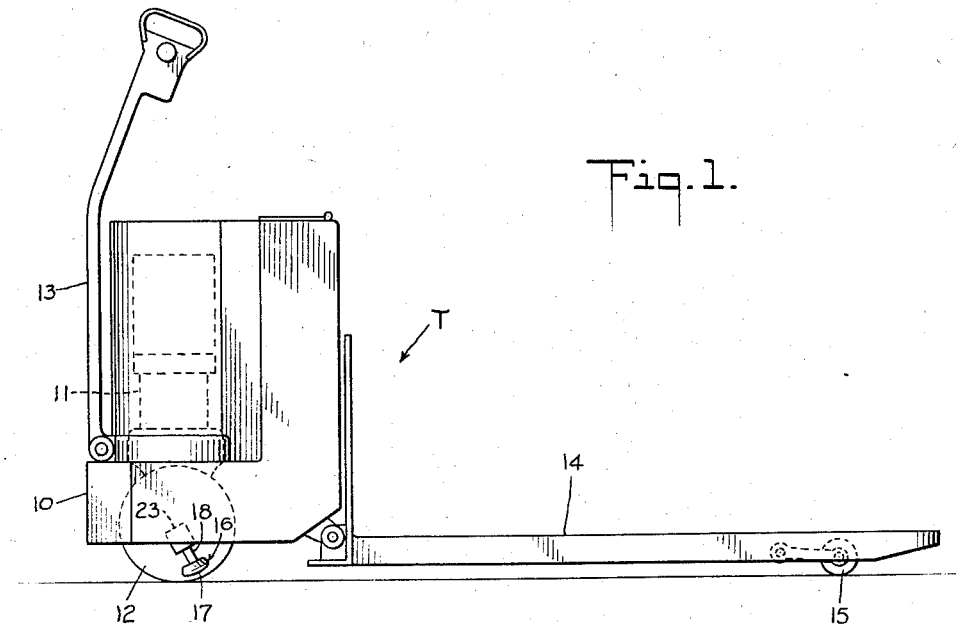
Fig. 1 is a side view showing a truck that utilizes my novel stabilizing means.
Figure 2:
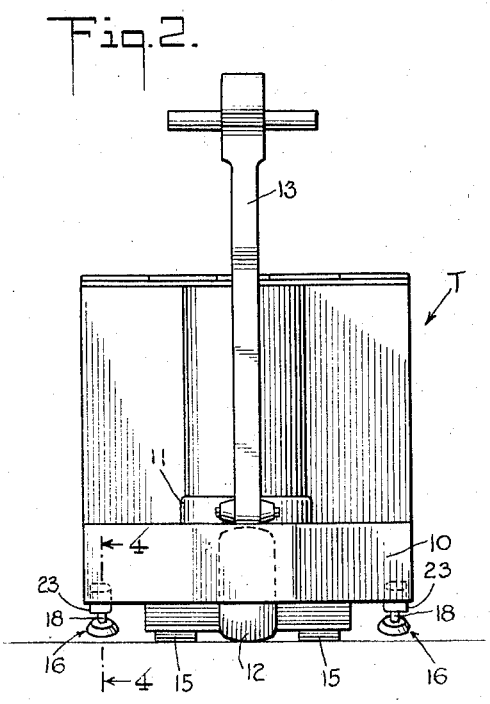
Fig. 2 is a front view of the truck.
Figure 3:
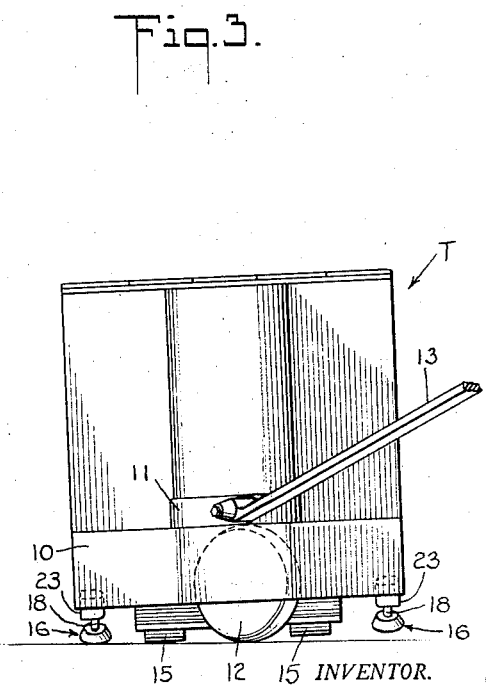
Fig. 3 is similar to Fig. 2 but illustrates the stabilizing action of my novel means when the truck tends to tip.

For the purpose of describing my invention, I show in Figs. 1, 2 and 3 a three-wheel powered truck T of the type shown in the Quayle Patent No. 2,614,643, to which I have already referred. The trucks of the particular type are constructed with a main frame 10 upon which is a steering and traction unit 11, that unit having a ground engaging wheel 12 whereby to support the front end of the truck. The wheel 12 acts to drive and to brake the truck, and also steers the truck when the unit 11 is rotated on the frame 10, as by a steering and control handle 13. The rear end of the truck T has a load platform 14, and two wheels 15 supporting that end of the truck, as will be understood by those skilled in the art. The further details of the truck T are not important to an understanding of my invention, and it is important merely to know that the truck is supported upon its two rear wheels 15 and the front steering and driving wheel 12. The trucks utilizing that wheel arrangement have a tendency to tip under certain conditions, as is set forth in the Quayle patent. The tipping tendency is particularly strong when the front wheel 12 steers the truck at an angle, as in Fig. 3, since the driving or braking reaction of that wheel is then applied in a direction transverse to the truck.

In describing the novel stabilizer that I have now conceived, I shall first call attention to the fact that I utilize upon each side of the truck T a rotating stabilizer member or button 16. Each member or button 16 has on one end a dome shaped ground engaging surface 17, well shown in Figs. 4 and 5, whereby to stabilize the truck in an extremely novel way that I shall presently describe.

In the construction that I prefer, I mount each button 16 on the truck through an inclined shaft 18, best shown in Fig. 4. For the particular purpose, I form the button 16 with an internal circular seat 19 whereby to accept a ball bearing 20, that bearing being assembled on the lower end of shaft 18 through a snap ring 21. I utilize to hold the button 16 in assembled position a washer 22 that is engaged in an internal groove in button 16, the washer preferably being formed of rubber or similar material, and extending over the bearing 20 and against the periphery of shaft 18 whereby to form a seal for the bearing. Through the bearing 20, the stabilizing button 16 is assembled to rotate in the axis of shaft 18, with the dome shaped surface 17 on the button centered relatively to that axis.

For mounting each shaft 18 on the truck T, I show a mounting block 23 that is integrally secured, as by welding, to a side of the truck frame 10. Each block 23 has an inclined bore 24, Fig. 4, that is threaded to coact with a screw portion 25 on the corresponding shaft 18, the block 23 thus supporting the shaft 18 with its axis at a substantial angle to the vertical. I prefer so to arrange that angle that the inclination of the shafts 18 will be toward the rear of the truck, as best seen in Figs. 1 to 3, with the shafts lying in planes that are parallel to the longitudinal truck axis.

The threaded mounting of each shaft 18 naturally will enable the shaft to be rotated to adjust the spacing of button 16 relatively to the ground. To hold the button in adjusted position, I show a transverse wedge bolt 26 on the mounting block 23, Figs. 4 to 6, that wedge bolt having a wedging surface 27 that is adapted to be pressed against shaft 18 through the action of a nut 28 on the bolt, whereby to prevent rotation of the shaft. I have found that I obtain very satisfactory results if I adjust the buttons 16 to be spaced one-half inch from the ground when the truck is in its normal stable position, shown in Fig. 2, but a different spacing may be preferred under different conditions of truck use.

It is extremely important to observe that each shaft 18 by its angular position will support its button 16 in a particular relation to the ground surface. Thus, as perhaps best shown in Figs. 4 and 5 of the drawings, the dome shaped surface 17 on each button 16 is in position to contact the ground, so that the truck when starting to tip will roll on that continuous rounded surface, somewhat as in the Quayle patent. Therefore, the button 16 will not have a hard reaction when moving against the ground. It is necessary to realize also that each button 16 by its angular position will present toward the ground a particular part 29 of its dome shaped surface 17, Figs. 4 and 5, that part 29 being at one side of the axis in which the button rotates. When the shaft 18 is inclined rearwardly, as I have described, the surface part 29 that contacts the ground will be offset toward the front of the truck relatively to the axis in which the button 16 rotates, as will be appreciated from Fig. 1.

Through that offset contact, the movement of the truck will rotate the button 16 when the truck tips. That button by rotating will enable the truck to move with relative ease, and will not react to jog the truck. Moreover, the truck movement will be particularly effective to rotate the button 16 if the truck tips while steered at an angle, as shown in Fig. 3, since button 16 can then rotate in the direction of the truck movement. Because the truck is most likely to tip when so steered, I am able to utilize to the best advantage the stabilizing action of the buttons 16. Thus, it will be understood that I not only enable the truck to roll on the buttons 16, somewhat in the manner described in the Quayle patent, but also to move easily on those buttons when steered at an angle. Thereby I am able very effectively to stabilize the truck relatively to the ground so that it will not jog from side to side, regardless of the direction in which the truck is steered when it starts to tip.

I have described a particular mounting for my novel stabilizing members or buttons 16 merely for the purpose of disclosing my invention, and it is conceivable that other means may be utilized for mounting those buttons. Therefore, I do not wish to be limited to the details of the mounting that I have described. It is important to understand merely that I utilize on each side of the truck a stabilizing member or button having a dome shaped ground contacting surface, with the button mounted to rotate in an axis that is inclined so that the button will present toward the ground a part of its surface at one side of that axis. It is through that novel concept that I am able very effectively to stabilize a three-wheel powered truck, so that the truck when starting to tip will roll relatively to the ground without jogging, regardless of the direction in which the truck moves. I believe, therefore, that those skilled in the art will appreciate the very considerable value of my invention.

I now claim:

1. In a truck of the class described having a frame, a wheel rotatably mounted at the forward end of the frame, laterally spaced load wheels at the rear of said truck coacting with the forward wheel for supporting said truck for normal movement on said wheels, a stabilizing member having a dome or button-shaped stabilizing surface, means fixed to said truck and mounting said member on one side of the truck with the member spaced from the ground when the truck is in a normal stable position, a bearing mounting the stabilizing member for rotation on an inclined axis that lies in a plane substantially parallel to the longitudinal axis of the truck, and said member rotating on said bearing through contact between its dome-shaped surface and the ground when the truck tends to tip while steered at an angle.

2. In a truck of the class described having a frame, a wheel rotatably mounted at the forward end of the frame, laterally spaced load wheels at the rear of said truck coacting with the forward wheel for supporting said truck for normal movement on said wheels, a rearwardly and downwardly inclined shaft fixedly mounted on each side of the truck to lie in a plane parallel to the longitudinal axis of the truck, a pair of stabilizer buttons each formed with a continuous dome-shaped end surface, a bearing mounting each stabilizer button on one of the shafts for rotation on the inclined shaft axis with the button in position between the axes of the forward wheel and of the load wheels and normally in spaced relation to the ground, each bearing supporting its button with the dome-shaped surface of the button centered relatively to the inclined axis on which the button rotates and to present toward the ground a part of the dome-shaped surface that is offset longitudinally of the truck relatively to that axis, and one button or the other rotating through contact between its said surface part and the ground incidental to truck movement when the truck is steered at an angle and tips on its forward wheel and one of its load wheels.

3. In a truck of the class described having a frame, a wheel mounted for steering rotation at the forward end of the frame, laterally spaced load wheels at the rear of said truck coacting with the forward wheel for supporting said truck for normal movement on said wheels, a pair of stabilizing members each having a dome-shaped end surface, mounting means for one stabilizing member fixed on each side of the truck, said mounting means supporting each stabilizing member normally in spaced relation to the ground and for rotation in a plane inclined fore and aft and extending transversely of the truck, said mounting means by so supporting the stabilizing members presenting a side portion of the dome-shaped end surface of each member for contact with the ground when the truck tilts in one direction or the other on its forward wheel and one of the load wheels, and each of said stabilizing members rotating on its mounting through contact between its said surface portion and the ground.

References Cited in the file of this patent

UNITED STATES PATENTS

| | | |
|---|---|---|
| 947,112 | Love | Jan. 18, 1910 |
| 1,975,661 | Powell | Oct. 2, 1934 |
| 2,096,239 | Geyer | Oct. 19, 1937 |
| 2,614,643 | Quayle | Oct. 21, 1952 |